(12) United States Patent
Tuma

(10) Patent No.: US 10,144,366 B2
(45) Date of Patent: Dec. 4, 2018

(54) FASTENING SYSTEM

(71) Applicant: Gottilieb Binder GmbH & Co. KG, Holzgerlingen (DE)

(72) Inventor: Jan Tuma, Herrenberg (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 85 days.

(21) Appl. No.: 14/401,861

(22) PCT Filed: May 24, 2013

(86) PCT No.: PCT/EP2013/001531
§ 371 (c)(1),
(2) Date: Nov. 18, 2014

(87) PCT Pub. No.: WO2013/178339
PCT Pub. Date: Dec. 5, 2013

(65) Prior Publication Data
US 2015/0158437 A1 Jun. 11, 2015

(30) Foreign Application Priority Data

Jun. 1, 2012 (DE) .................. 10 2012 010 893

(51) Int. Cl.
| F16B 5/06 | (2006.01) |
| B60R 13/02 | (2006.01) |
| F16B 5/07 | (2006.01) |
| F16B 19/00 | (2006.01) |
| F16B 21/08 | (2006.01) |
| F16B 43/00 | (2006.01) |

(52) U.S. Cl.
CPC ............ B60R 13/0206 (2013.01); F16B 5/07 (2013.01); F16B 19/002 (2013.01); F16B 21/088 (2013.01); F16B 43/001 (2013.01); *Y10T 24/303* (2015.01)

(58) Field of Classification Search
CPC . B60R 13/0206; Y10T 24/303; Y10T 24/309; Y10T 24/27; Y10T 24/2708; Y10T 24/30
See application file for complete search history.

(56) References Cited

U.S. PATENT DOCUMENTS

| 4,077,072 A | 3/1978 | Dezura |
| 4,531,733 A | 7/1985 | Hall |

(Continued)

FOREIGN PATENT DOCUMENTS

| DE | 195 19 623 A1 | 12/1996 |
| DE | 198 20 512 A1 | 11/1998 |

(Continued)

OTHER PUBLICATIONS

Thermelt Data Sheet.*

*Primary Examiner* — Victor D Batson
*Assistant Examiner* — Michael S Lee
(74) *Attorney, Agent, or Firm* — Wenderoth, Lind & Ponack, L.L.P.

(57) ABSTRACT

A fastening system has at least one holding part (7) that can be fitted to a component (1) and that on one side, has a flat carrier part (29L-35) provided with adhering or hooking elements (15) projecting on one side. The opposite side at the carrier part has at least one fastener (17). A sealing device (31; 41) is on the fastener (17).

10 Claims, 4 Drawing Sheets

(56) References Cited

U.S. PATENT DOCUMENTS

| | | | | |
|---|---|---|---|---|
| 5,058,245 | A | * | 10/1991 | Saito .................. A44B 18/0076 |
| | | | | 24/306 |
| 6,039,523 | A | | 3/2000 | Kraus |
| 2004/0219325 | A1 | * | 11/2004 | Schaty .................. B29C 45/263 |
| | | | | 428/64.1 |
| 2005/0235462 | A1 | * | 10/2005 | Takahashi ................. A41F 1/00 |
| | | | | 24/114.05 |
| 2008/0263834 | A1 | * | 10/2008 | Horimatsu ............. B60J 5/0468 |
| | | | | 24/457 |
| 2014/0053377 | A1 | * | 2/2014 | Poulakis .................. F16B 5/07 |
| | | | | 24/306 |

FOREIGN PATENT DOCUMENTS

| | | |
|---|---|---|
| DE | 198 27 472 A1 | 12/1999 |
| DE | 10 2008 007 913 A1 | 8/2009 |
| DE | 10 2010 006 571 A1 | 8/2011 |
| DE | 10 2010 027 394 A1 | 1/2012 |
| EP | 0 311 736 A1 | 4/1989 |
| EP | 0 465 983 A1 | 1/1992 |
| EP | 0 904 707 A1 | 3/1999 |
| EP | 0 921 323 | 6/1999 |
| EP | 1 481 603 A1 | 1/2004 |
| FR | 2470831 A1 | 12/1981 |
| FR | 2 868 135 A1 | 9/2005 |
| GB | 2 124 293 A | 2/1984 |
| JP | 57-31250 | 2/1982 |
| JP | 63-167904 | 11/1998 |
| WO | WO 98/46417 | 10/1998 |
| WO | WO 2005/113989 A1 | 1/2005 |

\* cited by examiner

FASTENING SYSTEM

FIELD OF THE INVENTION

The invention relates to a fastening device having of at least one holding part attachable to a component. The device has a flat carrier part on one side, which is provided with adhering or hooking elements protruding on one side, and has at least one fastener on the opposite side.

BACKGROUND OF THE INVENTION

Fastening devices of the above-mentioned type are prior art, see DE 10 2008 007 913 A1 or DE 10 2010 027 394 A1. As a component of a number of fastening units of a fastening system, such fastening devices may be used, inter alia, to fix third components on pre-definable points of components, whether they are parts of motor vehicles, trains, ships, or aircraft. Such third components can be, for example, plates on body parts of motor vehicles, panels or other planar coverings, for example, to conceal unattractive positions, or planar coverings for heat and/or sound insulation.

The connection between the relevant component and the third component to be fixed thereon is produced by an adhesive bond instead of by screwing, riveting, or nailing. Adhering or hooking elements are located on a fastener part of the holding part of the fastening device and are brought into adhesive engagement with a corresponding fastener part on the third component. A substantial reduction of the installation effort results. Also, the special advantage results that during the production of the adhesive bond, position tolerances between the component and the third component can be compensated for via the fastening system so that more efficient and cost-effective manufacturing is achievable, because narrow tolerance limits do not have to be observed.

SUMMARY OF THE INVENTION

An object of the invention is to provide an improved fastening device of the type mentioned at the outset, which is distinguished by more universal usage possibilities in relation to the prior art.

According to the invention, this object is basically achieved by a fastening device having at least one seal unit provided on its fastener. The fastening device according to the invention may thus also be used without difficulties at positions at which a harmful access of media, such as moisture, via the fastener to the third component must be avoided. In the known solution according to DE 10 2008 007 913 A1, an adhesive bond between the relevant component and the holding part is provided as the fastener to avoid liquid access. To also ensure reliable use under usage conditions in which particular thermal stresses can occur, as is the case in motor vehicle applications, for example, a temperature-resistant adhesive must be used in this case, whereby the disadvantage of higher costs results.

In a particularly advantageous manner, the fastening device according to the invention may be implemented such that the fastener has at least one protruding pin, which is provided for the engagement in a fastening hole of the component. The seal unit forms a seal between the holding part and the fastening hole. In this case, the arrangement can be made so that the seal unit has a seal element arranged on the respective pin.

A particularly simple and secure seal may be implemented in this case in that a seal ring is arranged on the respective pin as a seal element.

As an alternative construction of a corresponding seal element, a bushing, which can be placed like a hat on the pin, having a flange-type opening edge, can be provided. The opening edge has the shape of a seal ring enclosing the pin.

Independently of the design of the respective seal element, the fastening device according to the invention may also be used in sensitive regions, for example, at positions subjected in vehicles to moisture and soiling, with little effort, for example, in regions between shell construction vehicle body columns and door sill plates, where a secure, moisture-tight seal is important at the respective fastening points.

With regard to the design of the fastener, the arrangement can advantageously be made so that at least one securing part is implemented on the respective pin of the holding part. The holding part forms a clip-type catch connection with the pin upon engagement of the pin in the associated fastening hole of the component. The connection by clipping can be carried out rapidly and efficiently with extremely low installation effort.

In a particularly preferred embodiment of the fastening device according to the invention, the axial spacing between the bottom side of the respective catch lug and the top side of the carrier part facing toward it is selected to be less than the total of the thickness dimensions of the preferably elastically yielding seal unit in its uncompressed starting state and the component in the adjoining region of its fastening hole. Particularly preferably, when the holding part is fixed on the component, the seal unit also presses as flatly against the carrier part as it does on the component on one side thereof. Also the respective securing part on the opposite side of the component, which faces away from the seal unit, engages with this component at a pre-definable holding force. This holding force results from the restoring force of the elastically pre-tensioned seal unit in its fixed state on the component.

With the above-described measures, using the elastically yielding seal unit, which thus restores itself into an original position, a pre-tension may be produced in the region of the components to be sealed to one another, which increases the sealing force action in this manner.

At least one catch lug, which splays apart from the respective pin in a yielding manner, can be provided as a securing part, which engages behind the edge of the relevant fastening hole in the securing position inserted into the fastening hole.

Preferably, two catch lugs, situated diametrically opposite to one another, are provided on the respective pin.

For particularly efficient and cost-effective manufacturing, holding parts, pins, and catch lugs can be integrally molded from plastic.

Furthermore, the respective carrier part can be formed from a flat carrier plate, or can be implemented as a spacer body to form a spacing between its footprint, provided for contact on the component. The associated fastener part can have the adhering or hooking elements. The spacer body can have a rectangular shape having a depression, which forms the support surface for the adhesion closure part and is enclosed on the edges by a protruding frame.

Furthermore, the holding part can form a spacing between its footprint provided for contact on the component and the associated fastener part having the adhering or hooking elements. A spacer body can have a rectangular shape having a depression, which forms the support surface for the adhesion closure part and is enclosed on the edges by a protruding frame. By that spacer body, unequal structural heights, for example, within the third component, may be compensated for, so that spacer bodies having different structural heights can be used.

Regardless of whether the holding part has a structural height enlarged by a spacer body or not, the arrangement enables a centrally disposed pin to be provided as the fastener on the rectangular footprint of the holding part provided for contact on the component.

Alternatively to a design of the pin with laterally protruding, yielding holding lugs, the securing parts can also be formed by grooves, which are provided on the outer side of the pin, having radially protruding ridges.

The subject matter of the invention is also a fastening system having at least one fastening device described above.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
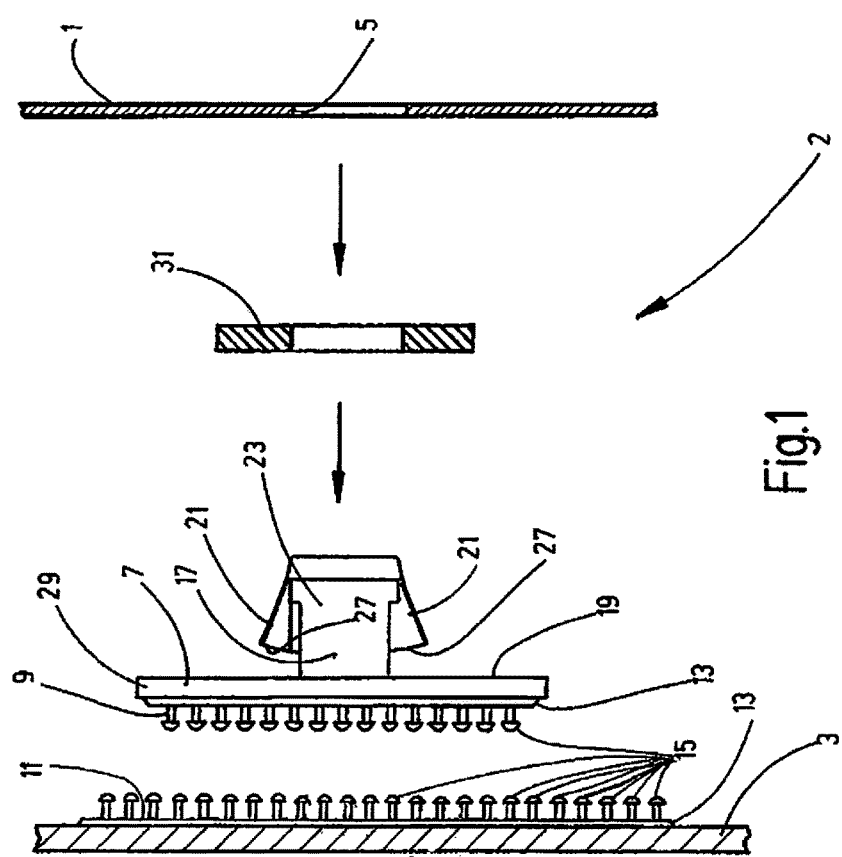
FIG. 1 is an exploded side view, schematically simplified and in partial section, of the essential components of a fastening unit of a fastening system according to a first exemplary embodiment of the fastening device according to the invention.

FIG. 1 shows the components of a fastening unit 2, which has an exemplary embodiment of the fastening device according to the invention. The components are depicted in FIG. 1 in the disassembled state. In this case, a component 1 is on the right side. A third component 3 is located on the left side in FIG. 1, and, is to be fastened using the fastening device. In this case, it can be a cover, for example, in the form of a plate, a panel, or another covering element or the like, which is to be fastened as the third component 3 on the component 1. The component 1 can be a sheet-metal part of a shell construction body, for example, part of a vehicle body column on which the third component 3 in the form of a door sill plate, for example, is to be fastened. The component 1 has in each case one fastening hole 5 for respective fastening units 2 of the system, of which only one fastening unit is shown in FIG. 1. This system enables, as explained hereafter, a clip connection using a holding part in the form of a carrier 7, on which a first fastener part 9 is located. A second fastener part 11, which corresponds to this fastener part 9, is attached on the third component 3 in a surface region having a spatial relationship to the carrier 7. An adhesive engagement is then producible between the first and second fastener parts 9 and 11 when the third component 3 is pressed against the carrier 7. When, as shown in FIG. 1, the second fastener part 11 has a larger surface area than the carrier 7 having the first fastener part 9, the adhesive engagement can also be performed with coarser tolerances of the positioning precision between the third component 3 and the carrier 7.

The attachment of the fastener parts 9 and 11 on the carrier 7 or on the third component 3, respectively, is preferably performed in such a manner that the respective carrier layer 13, being formed of plastic, and having the mushroom-pin-type hooking elements 15 connected, is glued to the associated carrier 7 or the third component 3. A pressure-sensitive adhesive with an acrylate base, or an artificial rubber adhesive can be provided for this purpose. However, adhesives having a moisture-cross-linking polyurethane are particularly preferably used as a permanent adhesive bond.

Figure 2:
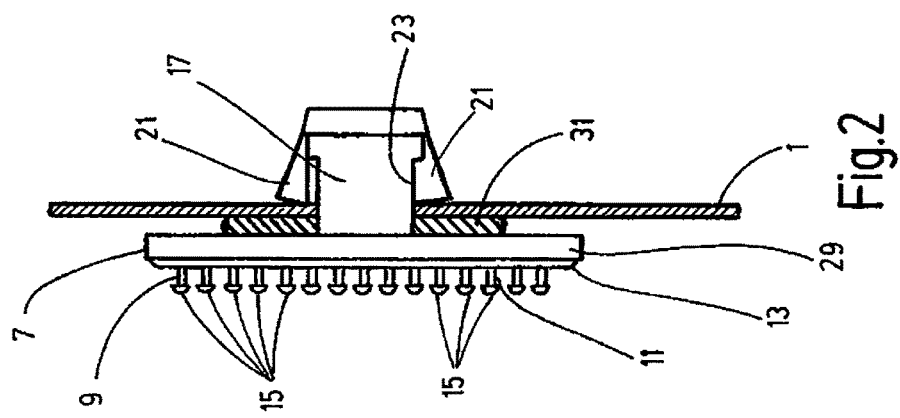
FIG. 2 is a side view, partially in section, of only the components of the fastening unit of FIG. 1, which components are attached preinstalled on the component to be fastened on the third component.
Figure 3:
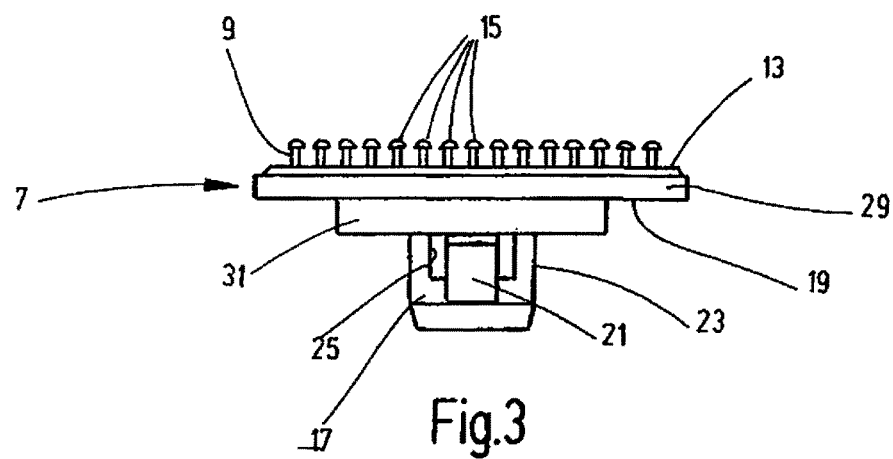
FIG. 3 is a side view of only a first embodiment of the holding part, which forms the carrier for the fastener part, which is provided for attachment on the component located on the right in the figure.
Figure 4:
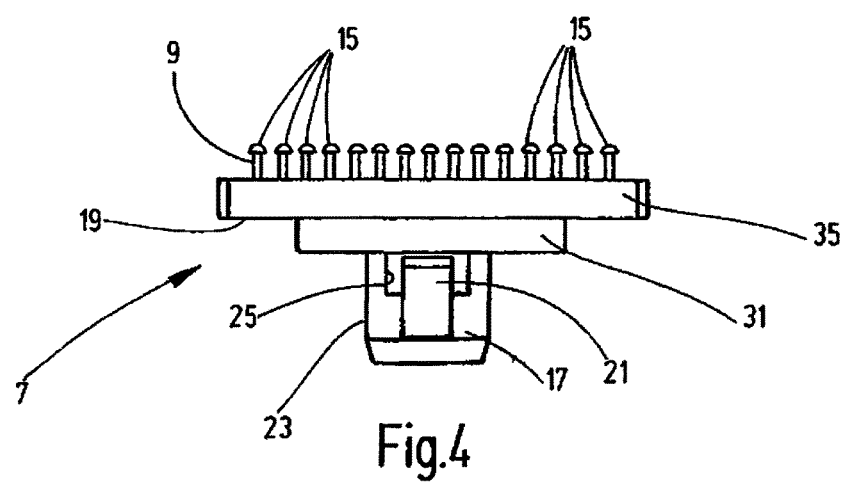
FIG. 4 is a side view of a carrier for the fastener part according to a second exemplary embodiment of the invention.

The respective fastening hole 5 in the component 1 is used, as already mentioned, to form a clip connection to the carrier 7 for the first fastener part 9. In the exemplary embodiments shown in FIGS. 2 to 6, the carrier 7 has, for forming the clip connection for each carrier 7, a fastener in the form of a pin 17. Pin 17 protrudes on the footprint 19, which is rectangular, or more precisely square in outline in the exemplary embodiments shown, at a central position or footprint 19. In the exemplary embodiments shown here, the pin 17 is molded integrally on the carrier 7, which is producible from plastic as an efficiently producible injection-molded part, for example, from polyamide 6 material or from an EBS material, in particular from PC ABS material (polycarbonate acrylonitrile butadiene styrene material). As can be inferred most clearly from FIGS. 1, 2, and 6, catch lugs 21 are provided on the pin 17 as securing parts. Lugs 21 form a safeguard by clipping for the clip connection to the component 1 upon insertion of the pin 7 into the associated fastening hole 5. The catch lugs are integrally molded with the pin 17, are movable in cutouts 25 of the hollow pin 17, and splay away from one another. Upon the insertion of the pin 17 into the associated fastening hole 5, the catch lugs 21 are first moved toward one another and then spread out again after passage through the hole 5, so that they engage behind the opening edge of the fastening hole 5 with catch surfaces 27 in the securing position. This installation state is shown in FIG. 2. FIGS. 3, 4, and 6 show the shape of the catch lugs 21 and the cutouts 25, which extend on both sides of the catch lugs 21 in the circular-cylindrical wall surface 23 of the hollow pin 17 in the axial direction.

To form a seal of the clip connection between the carrier 7 and the component 1, a seal unit associated with the clip connection is provided. As in the exemplary embodiments of FIGS. 1 to 6, a seal ring 31, has the shape of a flat ring, as shown in FIGS. 1, 2, and 6, and is preferably made of a synthetic rubber material. The seal ring 31 is arranged on the pin 17, as shown in FIG. 2, so that it presses against the footprint 19 of the carrier 7. In the preinstalled state shown in FIG. 2, in which the carrier 7 is fixed on the component 1 by clipping, the yielding seal ring 31 is pressed flat between the footprint 19 of the carrier 7 and the component 1 applied thereon. In relation to the unloaded thickness shown in FIG. 1, a desired sealing force is then active between footprint 19 and component 1. For this purpose, in adaptation to the respective material thickness of the component 1 and the thickness of the seal ring 31, the pin 17 of the carrier 7 is dimensioned such that the axial spacing between footprint 19 and the catch surfaces 27 on the catch lugs 21 generates the desired pre-tension on the seal ring 31 after the establishment of the clip connection. The seal ring is accordingly pressed flat in relation to FIG. 1, as shown in FIG. 2.

Figure 5:
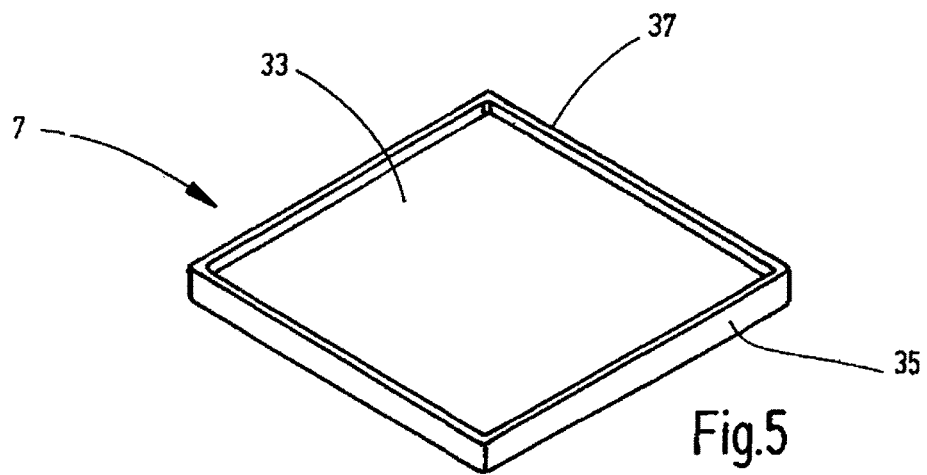
FIG. 5 is a perspective view, looking toward the top side of the carrier of FIG. 4, with the fastener part omitted.
Figure 6:
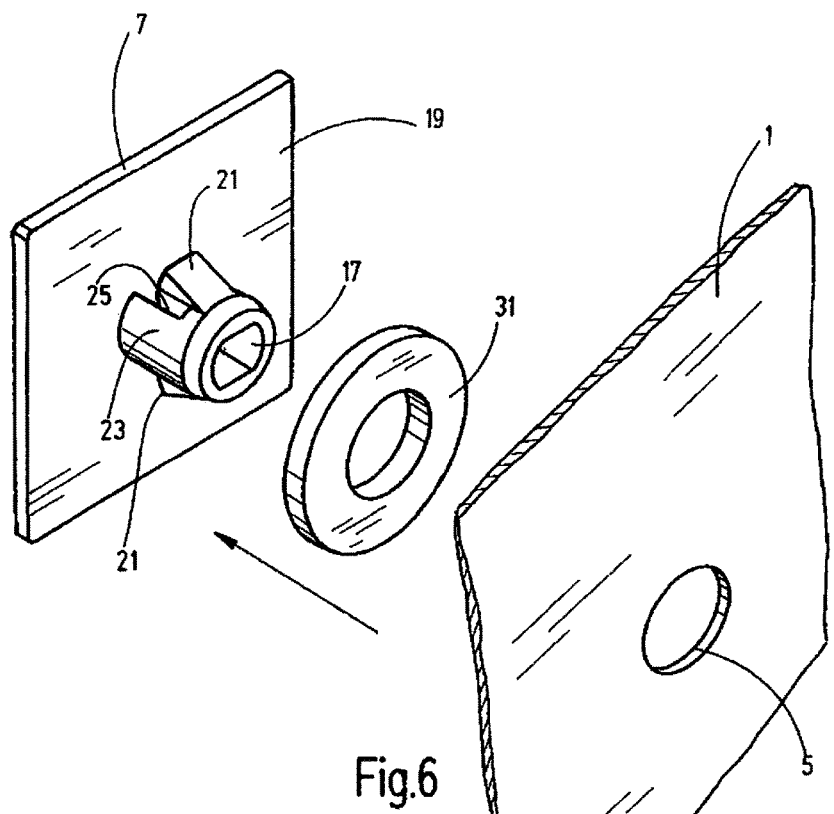
FIG. 6 is an exploded, partially cutaway perspective view, which is enlarged by approximately a factor of 2 in relation to a practical embodiment, of the components of the fastening unit of FIG. 1 provided for the preinstallation on the component.

FIGS. 3 to 5 show different embodiments of the carrier 7. In this case, FIG. 3 shows the same construction of the carrier as is provided in FIGS. 1 and 2. In FIG. 3, the carrier 7 forms, between the footprint 19 and the support surface for the layer 13 of the fastener part 9, a comparatively flat plate 29 of square outline. In contrast, FIGS. 4 and 5 show a construction in which the carrier 7 has a spacer body 35 having a square outline between the footprint 19 and the support surface 33 (FIG. 5) for the fastener part 9. The spacer body 35 forms a box-type component. A protruding frame 37 encloses the support surface 33 for the fastener part 9 (not shown in FIG. 5) at the edges. The layer 13 of the fastener part 9 (not shown in FIG. 5) can be received, fitting in the depression thus formed. By selecting the height of the respective spacer body 35, spacings of desired dimensions can be implemented between component 1 and third component 3 at the respective connection points, for example, to compensate for unequal structural heights of the components 1, 3 to be connected and/or to form intermediate spaces between the components 1, 3, in which functional elements, such as cables or lines, can be laid.

In the present exemplary embodiments, the hooking elements 15 of the fastener parts 9 and 11 are implemented in the manner of mushroom pins. The respective mushroom pins are connected via bars or rods to the respective carrier layer 13. However, a fastener part in the form of a hook-and-loop material (not shown in greater detail) could also be provided on the part of the component 1 or the third component 3, which then hooks accordingly with the mushroom pins of the other fastener part. Furthermore, the possibility exists of forming an adhesive engagement of male closure elements, such as hooks, mushrooms, and the like, with female closure elements, such as loops. Various types of constructions which come into consideration are prior art, for example, in those embodiments which are disclosed in the above-mentioned documents of the prior art, DE 10 2008 007 913 A1 or DE 10 2010 027 394 A1.

Figure 7:
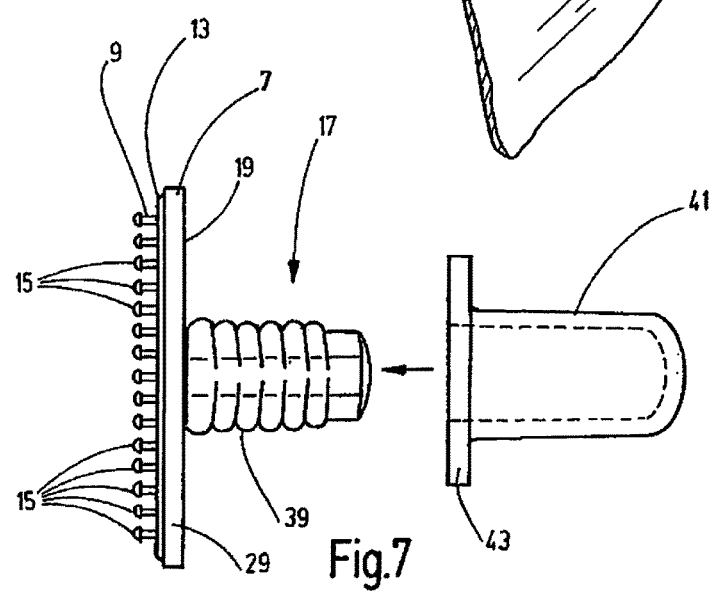
FIG. 7 is a side view of a carrier having a seal unit assigned thereto in the form of a seal bushing according to a third exemplary embodiment of the invention.

FIG. 7 shows a variant shape of the pin 17, which is provided as the fastener on the carrier 7, and the seal unit assigned thereto. Instead of yielding movable catch lugs 21 of the above-described example, the pin 17 in the example of FIG. 7 has grooves 39 having radially protruding waves. The waves establish the clip connection by being forced into the relevant fastening hole 5 with a slight plastic deformation of the plastic material of the carrier 7. Instead of a seal ring 31 seated on the pin 17, in this example, a seal bushing 41 is provided, which can be pressed onto the pin 17 like a hat. The bushing 41 is manufactured from a pliant material, for example, a synthetic rubber material, so that the flange shaped opening edge 43 of the bushing 41 functions as a seal ring in the position placed on the pin 17, while the wall of the bushing 41 adapts to the grooves 39 of the pin 17. The clip connection then comes into effect when the pin 17 is inserted together with the bushing 41 into the respective fastening hole 5.

In the present exemplary embodiments, a centrally arranged pin 17, which is integrally molded on the carrier 7, is provided as the fastener on the footprint 19 of the carrier 7 in each case. Obviously, more than one pin 17 can be provided on the carrier 7. The respective fastener can also be formed by a separate component fastened on the carrier 7, for example, by gluing or a screw connection. Instead of a pin 17 that is round on the whole, a nonround or polygonal element could be provided. This alternative shape applies accordingly to the fastening hole 5. Instead of the round hole shown, nonround or polygonal openings could be provided on the component 1, which are dimensioned so that the clip connection takes place with securing parts on a protruding pin 17, whether it is round or has another shape. Instead of the ring 31 shown as a flat ring, another type of seal element could also be provided, for example, in the form of an O-ring or profile ring or the like. Instead of the square outline shape of the carrier 7, another rectangular shape, a polygonal shape, or a round or oval or other arbitrary type of outline shape could also be provided for the carrier 7. Instead of the usage of fastener parts 9, 11 having hooking elements 15 located on a carrier layer 13, these elements could be formed, for example, in the shape of mushroom pins, directly from the plastic material of the carrier 7.

While various embodiments have been chosen to illustrate the invention, it will be understood by those skilled in the art that various changes and modifications can be made therein without departing from the scope of the invention as defined in the claims.

The invention claimed is:

1. A fastening device, comprising:
   a holding part attachable to a component, said holding part having a planar carrier part with at least one of protruding adhering or hooking elements on a first side thereof;
   a fastener on a second side of said planar carrier part, said first side being opposite said second side, said fastener including a protruding hollow pin engageable with a fastening hole in the component, said hollow pin having two diametrically opposed catch lugs integrally formed on said hollow pin, said catch lugs being movable in cutouts in said hollow pin and splay apart from one another, said cutouts extending on each side of each of said catch lugs in a wall surface of said hollow pin in an axial direction of said hollow pin; and
   an elastically yielding seal element on and penetrated by said hollow pin and capable of forming a seal between said holding part and the fastening hole, said seal element having a shape of a flat ring and being made of a synthetic rubber material, said seal element pressing flatly against said carrier part and on a side of the component facing said seal element, said catch lugs pressing against an opposite side of the component remote from said seal element with a holding force when said holding part is mounted on the component, the holding force resulting from a restoring force of said seal element.

2. A fastening device according to claim 1 wherein said catch lugs are resiliently connected to and biased radially outwardly relative to said hollow pin, said catch lugs engaging behind an edge of the fastening hole in a securing position inserted into the fastening hole.

3. A fastening device according to claim 2 wherein
a bottom side of each said catch lug is spaced axially from a top side of said carrier part facing said bottom side by a distance less than a total thickness of said seal element and the component in a region adjoining the fastening hole.

4. A fastening device according to claim 1 wherein
said holding part, said hollow pin and said catch lugs comprise an integral, injection molded plastic piece.

5. A fastening device according to claim 1 wherein
said carrier part comprises a spacer body with a rectangular shape and with a depression forming a support surface for said protruding adhering or hooking elements, said depression being enclosed on edges thereof by a protruding frame.

6. A fastening device according to claim 1 wherein
said hollow pin is centrally located on a rectangular footprint of said holding part that is engageable with the component.

7. A fastening system, comprising:
a component having a fastening hole therein;
a holding part attachable to said component, said holding part having a planar carrier part with at least one of protruding adhering or hooking elements on a first side thereof;
a fastener on a second side of said planar carrier part, said first side being opposite said second side, said fastener including a protruding hollow pin engageable with said fastening hole in said component, said hollow pin having two diametrically opposed catch lugs integrally formed on said hollow pin, said catch lugs being movable in cutouts in said hollow pin and splay apart from one another, said cutouts extending on each side of each of said catch lugs in a wall surface of said hollow pin in an axial direction of said hollow pin; and
an elastically yielding seal element on and penetrated by said hollow pin and forming a seal between said holding part and said fastening hole, said seal element having a shape of a flat ring and being made of a synthetic rubber material, said seal element pressing flatly against said carrier part and on a side of said component facing said seal element, said catch lugs pressing against an opposite side of said component remote from said seal element with a holding force with said holding part being mounted on said component, the holding force resulting from a restoring force of said seal element.

8. A fastening system according to claim 7 wherein
said catch lugs are resiliently connected to and biased radially outwardly relative to said hollow pin, said catch lugs engaging behind an edge of said fastening hole in a securing position inserted into said fastening hole.

9. A fastening system according to claim 7 wherein
a bottom side of each said catch lug is spaced axially from a top side of said carrier part facing said bottom side by a distance less than a total thickness of said seal element and said component in a region adjoining said fastening hole.

10. A fastening system according to claim 7 wherein
said carrier part comprises a spacer body with a rectangular shape and with a depression forming a support surface for said protruding adhering or hooking elements, said depression being enclosed on edges thereof by a protruding frame.

\* \* \* \* \*